United States Patent [19]

Yamashita et al.

[11] Patent Number: 5,412,770
[45] Date of Patent: May 2, 1995

[54] CAD FREE-FORM RESHAPING METHOD

[75] Inventors: Juli Yamashita; Yukio Fukui, both of Higashi, Japan

[73] Assignee: Agency Of Industrial Science And Technology, Tokyo, Japan

[21] Appl. No.: 125,854

[22] Filed: Sep. 24, 1993

[30] Foreign Application Priority Data

Sep. 25, 1992 [JP] Japan .................................. 4-280813

[51] Int. Cl.$^6$ .............................................. G06F 15/00
[52] U.S. Cl. .................................................... 395/142
[58] Field of Search ............... 395/140, 141, 142, 133; 345/133, 16, 24

[56] References Cited

U.S. PATENT DOCUMENTS

| | | | |
|---|---|---|---|
| 4,686,635 | 8/1987 | Schrieber | 364/523 |
| 5,261,033 | 11/1993 | Oka | 395/142 |
| 5,261,034 | 11/1993 | Kawata | 395/143 |

*Primary Examiner*—Phu K. Nguyen
*Attorney, Agent, or Firm*—Oblon, Spivak, McClelland, Maier, & Neustadt

[57] ABSTRACT

An method to reshape parametrically expressed free forms on a CAD system permits more natural reshaping by direct reshaping and smoother reshaping of curves by simultaneously moving multiple control points. The reshaping method determines whether a cursor whose coordinates are input from an input device has traversed the free form, calculates new form-defining parameters to determine a segment of the form including the point of traverse when the cursor proved to have traversed so that the newly created segment of the form does not intersect the locus drawn by the traversing cursor, and achieves the intended reshaping by creating a new form based on the new form-defining parameters.

3 Claims, 2 Drawing Sheets

CAD FREE-FORM RESHAPING METHOD

FIELD OF THE INVENTION

This invention relates to a method of reshaping free forms (consisting of curves and/or surfaces) parametrically expressed on CAD (computer-aided design) systems used in design engineering and other similar applications.

DESCRIPTION OF THE PRIOR ART

Reshaping of free forms (curves and/or surfaces) represented by computers have conventionally been achieved several methods, which include:

(A) The control-point method that indirectly reshapes and controls the forms parametrically represented by such form-defining parameters as control points and knots by altering, increasing or decreasing the parameters peculiar to such expressions as the B-Spline and Bezier curves, which is elaborated in, for example, "Mathematical Elements for Computer Graphics (Second Edition) by D. F. Rogers and J. A. Adams, McGraw-hill, 1989."

(B) The interpolation method (using the n-degree spline curve etc.) that reshapes forms by moving sample points.

The method (A) draws a B-spline curve C of degree three calculated from such form-defining parameters as the coordinates of a given number of control points (V0 to V6), as shown in FIG. 1, and reshapes the curve C by moving the pertinent control points and other parameters as required. When control point V3 is moved to V3' in FIG. 1, for example the curve C changes into a reshaped curve C' as a result of calculation according to the definition of the B-Spline curve described in the aforementioned literature. This control-point method is most popularly used for the expression of curves and surfaces in today's CAD systems.

However, the control-point method presents the following problem when indirectly reshaping forms by altering or increasing or decreasing control points, knots, weights and other form-defining parameters:

a) Reshaping accomplished indirectly through the alteration or other manipulation of form-defining parameters involves an naturalness that the operator cannot directly touch the form to be reshaped. Besides, parameters differ with individual form representing methods, and, therefore, reshaping methods differ with individual form representing methods.

b) To achieve the desired reshaping, control points or other form-defining parameters must be moved. However, the parameters to be moved and the amount of their movement are difficult to determine because the rate of contribution of the individual control points or other parameters to the form they make up is not linear. Accordingly, the control-point method is difficult to use without having knowledge of the characteristics of the individual form-defining parameters.

c) When reshaping covers a large area, all control points making up the curve or surface in the area in question must be moved. When the pertinent control points are moved one by one, the image of the whole curve or surface is likely to be lost.

On the other hand, the method (B) is not used for the reshaping on the CAD systems because it necessitates the solving of simultaneous equations prior to each reshaping and tends to cause undesirable oscillations in the vicinity of the end points of curves.

SUMMARY OF THE INVENTION

An object of this invention is to permit direct reshaping of forms on the display by pushing a portion thereof with a cursor, thereby producing natural reshaped forms while retaining the locality and other advantages of the control-point method (A) that parametrically expresses forms using form-defining parameters.

To put it more plainly, an object of this invention is to introduce into the control-point method a straight-forward interface that "dents and swells a form" through the manipulation of a cursor.

Another object of this invention is to permit simultaneous movement of multiple control points through the manipulation of a cursor, thereby permitting natural and smooth reshaping of the whole curve or surface.

This invention reshapes a free form made up of curves and/or surfaces parametrically expressed by form-defining parameters on a computer display of a CAD system by the following characteristic method. To beging with, the system always checks whether a cursor whose coordinates are input from an input device has traversed the displayed free form. When the cursor has traversed the free form, the system calculates new form-defining parameters that define a segment of the form containing the traverse point so that the newly created curve should not intersect the locus drawn by the traversing cursor. Then, the system creates a new form based on the newly obtained form-defining parameters.

The above method of this invention permits specifying a fixed point on the free form to be reshaped from an input device, fixing the dead point so that it remains unchanged during the reshaping operation.

This method directly processes the curves or surfaces making up a free form parametrically expressed on a CAD system and creates a new curve or surface based on the amount of sub-direct processing. Therefore, this method permits natural reshaping while retaining the locality and other advantages of the conventional parametric form representations.

Furthermore, the capabilities to simultaneously move multiple control points and achieve partial reshaping by specifying a fixed point permit easy and efficient displaying of the image of a curve or surface and smooth reshaping of the entirety the curve or surface.

DESCRIPTION OF THE PREFERRED EMBODIMENTS

Figure 1:
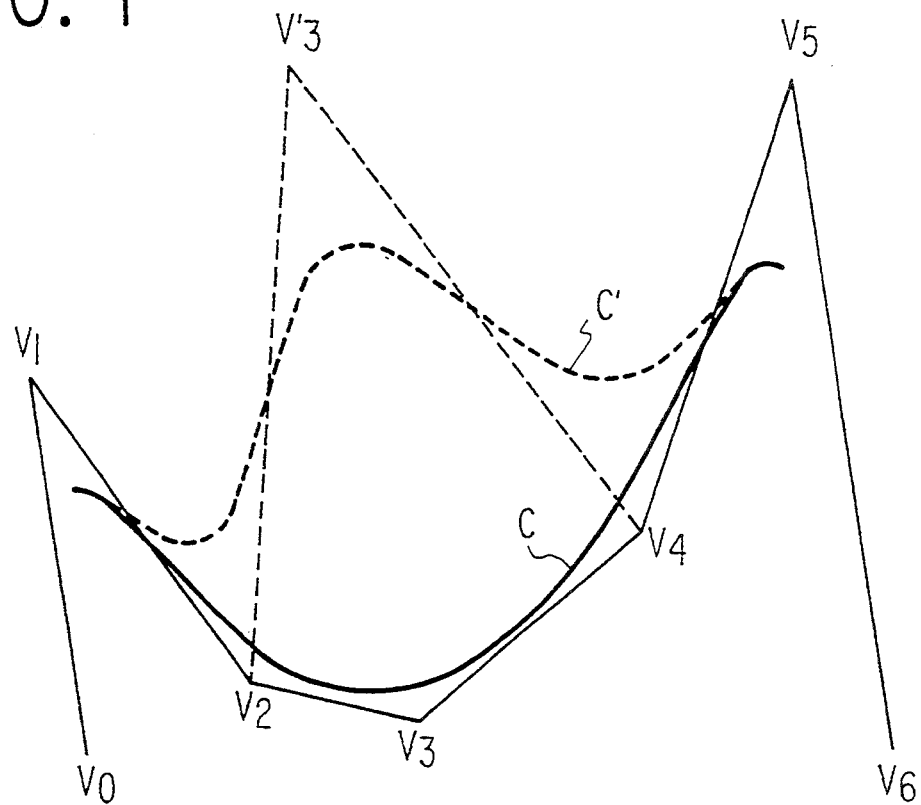
FIG. 1 shows an example of a free form reshaped by a conventional control-point method.
Figure 2:
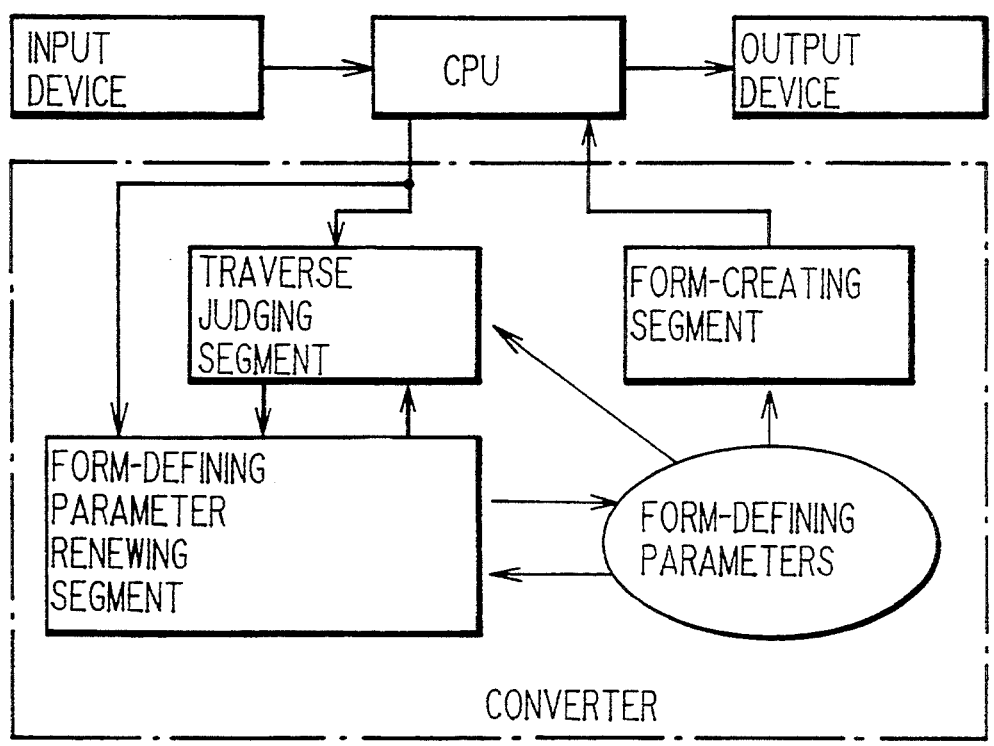
FIG. 2 is a block diagram of a system to implement the free-form reshaping method of this invention.

FIG. 2 shows a system to implement the reshaping method according to this invention. In FIG. 2, a computer (herein called the CPU) inputs data through one or more input devices including a mouse, tablet, keyboard and magnetic three-dimensional locator, performs control operations, shapes and memorizes curves, surfaces and other forms recording to the operator's commands, and outputs the shaped forms on a CRT or other types of display unit. The input device sends the coordinates representing the position of a cursor to the CPU through a signal line. The CPU converts the coordinates, which constitute a two-dimensional or three-dimensional data peculiar to the input device employed, into coordinates m for the free form in question, such as x and y if the form is two-dimensional and x, y and z if the form is three-dimensional.

A converter connected to the CPU is the central core of this system which consists of microcomputer having a segment to judge whether the cursor has traversed the free form, a segment to change the form-defining parameters programmed to create new parameters based on the result of the judgement, and a segment to shape a new form using the newly created form-defining parameters. The CPU itself can be designed to perform all of the above functions assigned to the different segments of the converter.

The traverse judgement segment judges whether a cursor has traversed the displayed free form by checking the coordinates m specifying the position of the cursor supplied from the CPU through the signal line. When the Cursor has traversed, the parameter changing segment determines a new set of control points or other form-degining parameters to define a segment of the form containing the traverse point. New parameters are cross-checked by making reference to the traverse judgement segment to determine if they are proper ones not intersecting the locus drawn by the traversing cursor. Then, proper new parameters are sent to the reshaping segment to create the desired form. The data for the calculation of the new set of control points or other form-defining parameters are supplied from the CPU which afterward receives the result of the calculation.

Referring now to the drawing, an example of the free-form reshaping method of this invention applied to a two-dimensional B-Spline curve is described below. Of course, the free-form reshaping method of this invention is also applicable to other types of parametrically represented forms, including Bezier, and readily extensible to permit the processing of three-dimensional forms.

To process a free form parametrically represented with control points and other form-defining parameters on a CAD system, the method of this invention converts the amount of a change in the form in question, which is reshaped by the movement of a cursor manipulated through a mouse or other input device, into a change in the control points or other form-defining parameters. Then, a new form is created based on the newly obtained form-defining parameters. This gives the user a feeling that the free form is reshaped directly.

The control point used here, the knots and the value of contribution of the control point discussed later are defined as the form-defining parameters peculiar to the expression of forms with the B-Spline curve. Their details conform to those of the popularly known B-Spline curve form-defining parameters elaborated in the literature on the control-point method (A) mentioned before. In brief, the control point is the coordinates of a point on or near a curve showing a rough shape of the curve, the knot a parameter specifying a specific point on a curve, and the value of contribution the weight of a control point.

Figure 3:
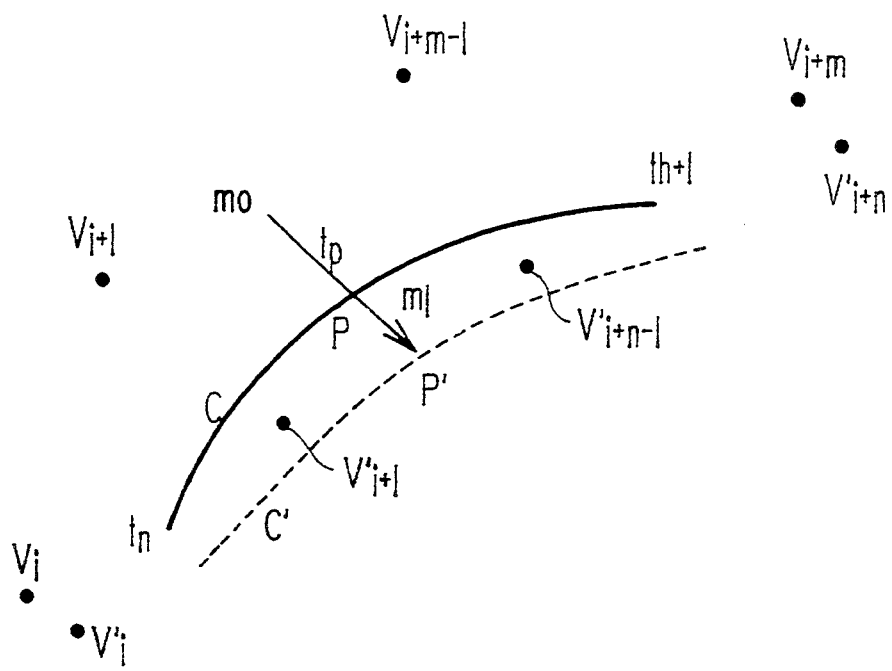
FIG. 3 shows the steps of the reshaping method according to this invention.

The following paragraphs describe the reshaping method of this invention by reference to FIG. 3.

(1) On receiving a free form reshaping request from the CPU initiated by, for example, pressing a mouse button, the traverse judgement segment of the converter traces the coordinates m (x, y) of a cursor, which are also supplied from the CPU, and checks whether the cursor has traversed the curve constituting the free form to be reshaped. When the cursor proves to have traversed, the process proceeds to step (2).

Whether the cursor has traversed the curve can be judged by various methods including one described below.

Assume that the cursor has moved over an infinitesimal distance from point m to point m'. Here, to judge whether the cursor has traversed the free form (curve C) is to determine if infinitesimal line Segment mm' and curve C has a point of intersection. Whether there is a point of intersection can be determined by the means a CAD system usually has to determine the point and line of intersection between various shape elements (curves, surfaces, straight lines, polyhedrons, and the like) handled in the system. If a point of intersection is found, then the cursor is considered to have traversed the free form to be reshaped. If the CAD system being used has no such means, a point of intersection between the parameters and equation expressing the form in question and line segment mm' can be analytically determined with a desired accuracy.

(2) To reshape a curve according to the amount of cursor motion, a new set of form-defining parameters, such as a group of control points Vi' and the knot vector t', constituting a curve segment including the point of intersection P, using function F.

$$\{V'\} = \{V_j' |$$

$$V_j' = F(j, \{V\}, \{W\}, m_o, m_l t_p), j=i, i+1, \ldots, i+n\},$$

where $m_o$ = the position of the cursor just before the traverse $m_l$ = the position of the cursor just after the traverse
P = the point at which the cursor traversed the curve
C = a segment of the curve including point P
$t\epsilon\{t_{ko}, t_{kl}\}$ = the range of the value of the knot parameter t for C
$t_p$ = the value of the knot parameter t at P
$\{V_i, \ldots, V_{i+m}\} = \{V\}$ = the group of control points constructuring C
$\{W_i, \ldots, W_{i+m}\} = \{W\}$ = the contribution value of control point $V_i$ at point P $$\{t'\} = \{t_k', t_k+i', \ldots, t_k+n-m+i'\},$$

$$t_{ko} = t_k' \leq t_k+i' \leq \ldots \leq t_k+n-m+i' = t_{kl}$$

Here, function F must satisfy a condition that a new segment of curve C' derived from V' does not intersect vector moml. This condition means that mo and ml are on the same side with respect to C'.

The new set of control points {V'} need not be in the same number as the original one {V}. The number of knots may be increased or decreased, too.

Concretely, function F depends on the type of the form and described reshaping, varying with the method of achieving reshaping as well.

(3) A curve produced based on newly created {V'} and {t'} is sent to the CPU that shows the received data on the display.

(4) The process returns to step (1) unless the CPU issues a request to discontinue reshaping (by releasing the mouse button, for example).

The new parameters defining the segment of curve including the point of traverse are derived by calculating the amount of the motion of the control points or other parameters back from the distance over which the mouse or other input device is moved so that the new segment of curve does not intersect the locus drawn by the traversing cursor. Then, the desired reshaping is accomplished by creating a new free form based on the new form-defining parameters.

Figure 4:
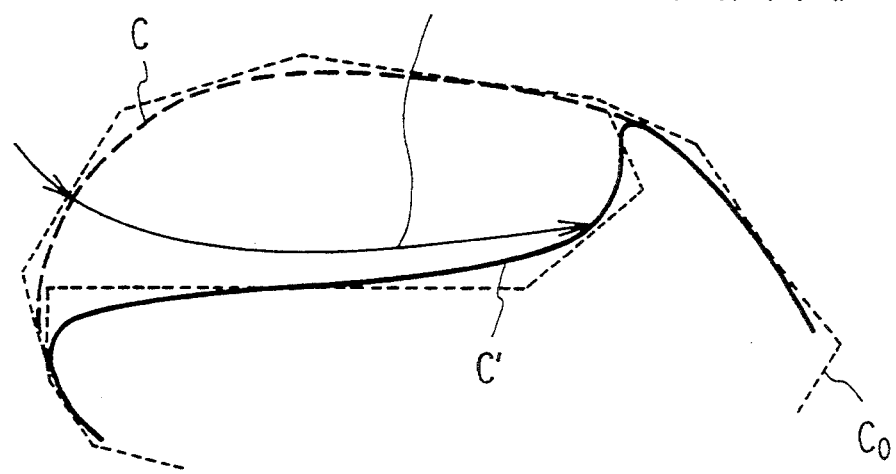
FIG. 4 shows an example of a free form reshaped by the method of this invention.

FIG. 4 shows a process of reshaping, in which a cursor presses original curve C into new curve C'. In this figure, $C_o$ is a control polygon. In actual operation, a reshaping request is input by pressing a mouse button or manipulating other input device so that a cursor moves to push a form (or a curve) to be reshaped (along the locus drawn in FIG. 4). Then, the form smoothly dents or swells in conformity with the amount of the push.

For example, function F used in the reshaping of a normalized B-spline curve of degree three is derived as follows:

Assume that a cursor traverses curve BS(t) consisting of a set of control points $\{V_o, V_1, V_2, V_3\}$ at point P.

$$BS(t) = \omega_0(t)V_0 + \omega_1(t)V_1 + \omega_2(t)V_2 + \omega_3(t)V_2$$

where $0 \leq t < 1$ $$\omega_0(t) = (-t^3 + 3t^2 - 3t + 1)/6$$

$$\omega^1(t) = (3t^2 - 6t^{2'} + 4)/6$$

$$\omega^2(t) = (-3t^3 + 3t^2 + 3t + 1)/6$$

$$\omega^3(t) = t^3/6$$

Then, a new set of control points $V_i'$ can be determined from the value tp of parameter t at point P that is derived from the position of point P as follows:

$$V_i' = V_i + k \cdot \omega_i(t_o) \cdot M$$

where k=a positive constant described below, M=a vector starting at $m_o$ and ending at $m_1$, and i=0, 1, 2 and 3.

The positive constant k is determined as required so that the segment of curve C' based on the set of control points {V'} satisfies the conditions described before. The following is one of several methods to determine the positive constant k.

(1) Put put k=1 initially.

(2) Determine $V_i'$ using k and check if a curve based on {V'} satisfies the conditions described before. Terminate the process if the conditions are satisfied, and proceed to step (3) if not.

(3) Increase the value of K by 1 and return to step (2).

The initial value of k need not always be 1, but may be determined analytically according to the distance of the cursor traverse.

This permits specifying the method of selecting a set of control points to be determined and function F to be used in the calculation thereof from the CPU.

A fixed point can be set on the form to be reshaped as described below. The fixed point is specified by moving a cursor close to a point on the displayed form that is desired to remain unchanged by pressing a mouse button or otherwise manipulating other input devices. The fixed point thus specified remains unchanged even while the reshaping operation (1) is under way. Besides, the effect of the reshaping operation does not reach beyond the fixed point.

The purpose of specifying the fixed point is to keep a given area in the vicinity thereof unaffected by the reshaping operation (1). To be specific, this can be achieved by fixing the control point overlapping the fixed point and the adjoining control points on both sides thereof by inserting knots of a given degree at a specified point without changing the shape of the curve. While assuring the continuity of the form, the fixed point itself can be moved with ease.

Setting the fixed point is particularly effective in limiting the range of free-form reshaping.

As is obvious from the above, the reshaping method of this invention permits direct smoother reshaping of forms without deliberately moving the control points as done in the conventional control-point method. It also permits the conventionally impossible simultaneous movement of multiple control points, with a resulting increase in the smoothness of the whole curve reshaped and a sharp reduction in work load.

The reshaping method of this invention is applicable not only to curves and surfaces but also to a wide variety of figures and solids including polygons and polyhedrons.

What is claimed is:

1. In a method of reshaping a free form consisting of curves or surfaces parametrically expressed by form-defining parameters on a computer display of a CAD system, the improvement which comprises the steps of:
   determining whether a cursor whose coordinates are input from an input device has traversed the free form;
   calculating new form-defining parameters to determine a segment of the form including the point of traverse when the cursor proved to have traversed so that the newly created segment of curve does not intersect the locus drawn by the traversing cursor; and
   achieving the intended reshaping by creating a new form based on the new form-defining parameters.

2. The improvement according to claim 1, in which the free form on the computer display is expressed by a B-Spline curve.

3. The improvement according to claim 1 or 2, in which a fixed point is specified in the free form to be reshaped from the input device so that a given area in the vicinity thereof remains unchanged without being affected by the reshaping operation.

* * * * *